(12) United States Patent  (10) Patent No.: US 7,418,666 B2
Cortesi et al.  (45) Date of Patent: Aug. 26, 2008

(54) SYSTEM, METHOD AND COMPUTER PROGRAM PRODUCT FOR MANAGING CAD DATA

(75) Inventors: Gino Cortesi, Exton, PA (US); Chuck Kirschman, Exton, PA (US); Paul Chater, London (GB); Josh Schifter, Exton, PA (US); Deepak Malkan, Exton, PA (US)

(73) Assignee: Bentley Systems, Incorporated, Exton, PA (US)

( * ) Notice: Subject to any disclaimer, the term of this patent is extended or adjusted under 35 U.S.C. 154(b) by 664 days.

(21) Appl. No.: 10/274,117

(22) Filed: Oct. 21, 2002

(65) Prior Publication Data

US 2004/0075688 A1  Apr. 22, 2004

(51) Int. Cl.
  *G06F 3/00* (2006.01)
  *G06F 3/14* (2006.01)
  *G06F 17/50* (2006.01)
  *G09G 5/00* (2006.01)

(52) U.S. Cl. .................. 715/765; 715/810; 715/964; 707/1; 703/1

(58) Field of Classification Search .............. 715/700, 715/764, 765, 810, 961, 964, 968, 866, 861, 715/864; 707/1, 10, 102, 104.1; 703/1
See application file for complete search history.

(56) References Cited

U.S. PATENT DOCUMENTS

| | | | | |
|---|---|---|---|---|
| 5,019,961 A * | 5/1991 | Addesso et al. | ............... | 700/87 |
| 5,293,479 A * | 3/1994 | Quintero et al. | ............. | 715/841 |
| 5,361,871 A * | 11/1994 | Gupta et al. | ................. | 186/61 |
| 5,467,444 A * | 11/1995 | Kawamura et al. | .......... | 345/441 |
| 5,634,016 A * | 5/1997 | Steadham et al. | ........... | 715/753 |
| 5,838,965 A * | 11/1998 | Kavanagh et al. | ....... | 707/103 R |
| 5,897,242 A * | 4/1999 | Hosoi | .......................... | 399/70 |
| 5,950,201 A * | 9/1999 | Van Huben et al. | ........... | 707/10 |
| 6,721,769 B1 * | 4/2004 | Rappaport et al. | .......... | 707/205 |
| 6,868,297 B1 * | 3/2005 | Rimoldi et al. | ............... | 700/98 |
| 6,895,373 B2 * | 5/2005 | Garcia et al. | ................... | 703/18 |
| 2002/0035408 A1 * | 3/2002 | Smith | .......................... | 700/97 |
| 2002/0083076 A1 * | 6/2002 | Wucherer et al. | | |
| 2001/0129001 * | 9/2002 | Levkoff et al. | ................. | 707/1 |
| 2002/0188622 A1 * | 12/2002 | Wallen et al. | ............ | 707/104.1 |
| 2003/0229482 A1 * | 12/2003 | Cook et al. | ................... | 703/14 |

(Continued)

OTHER PUBLICATIONS

MicroStation V8 (Administrator Guide) DAA004470-1/0006 Bentley, pp. 5-60 thru 5-61, 2002.

(Continued)

*Primary Examiner*—X. L Bautista
(74) *Attorney, Agent, or Firm*—Venable LLP; Jeffri A. Kaminski; James R. Burdett (57) ABSTRACT

A system and method providing an optimal way to create, manage and use resource data is provided. In an exemplary embodiment, the system and method provide the ability to store resource data in a library, namely a resource library. A resource library includes resource files that can be attached to a regular data file either automatically, for example, by setting an environment variable, or manually. More than one resource library or resource file may be created and simultaneously attached to a data file. The resource file defines attributes of elements that may be used in creating the CAD model. Typically, the resource library includes attributes that are to be standardized across a project, file, or model.

26 Claims, 3 Drawing Sheets

U.S. PATENT DOCUMENTS

2004/0015367 A1* 1/2004 Nicastro et al. ................. 705/1
2004/0024624 A1* 2/2004 Ciscon et al. ................... 705/7
2005/0091601 A1* 4/2005 Raymond et al. ........... 715/762

OTHER PUBLICATIONS

MicroStation V8 (User Guide) DAA016830-1/0002 Bentley, pp. 1-1 thru 1-24, 2002.

Selectservices Online—Dimensions FAQ #6201, http:/selectservices.bentley.com/technotes/faqs/6201.htm, Oct. 10, 2002.

Selectservices Online—Levels & Level Libraries FAQ #6214, http:/selectservices.bentley.com/technotes/faqs/6214.htm, Oct. 10, 2002.

Selectservices Online—Overriding and Resynchronizing Levels Attributes #8244, http:/selectservices.bentley.com/technotes/technotes/8244.htm, Oct. 10, 2002.

* cited by examiner

| | | |
|---|---|---|
| 128 — Level Library | Level Name | pipe |
| 130 — Pipe Level | Parent Level Name | -none- |
|    — Pipe D=10 | Color | green |
| 132 —   — Pipe D=20 | Line Width | 0:6.000 |
|    — Pipe D=20-30 | | |
| 134 — Electrical Level | | |
| Floor 1 | | |
| Floor 2 | | |
| 124 | 122 | 126 |

SYSTEM, METHOD AND COMPUTER PROGRAM PRODUCT FOR MANAGING CAD DATA

CROSS-REFERENCE TO RELATED APPLICATION

The present application is related to U.S. patent application Ser. No. 10/274,143 filed Oct. 21, 2002 entitled "System, Method and Computer Program Product for Constructing and Managing CAD Data In Cooperative Engineering Environments" to Chater et al., of common assignee to the present invention, the contents of which are incorporated herein by reference in their entirety.

FIELD OF THE INVENTION

The present invention relates generally to systems and methods for managing CAD data and more particularly for centralizing CAD data as libraries for distribution to users.

BACKGROUND OF THE INVENTION

Computer-aided design (CAD) drawings prepared by architects, engineers, designers, planners, and the like require large amounts of data to be stored in files. CAD software includes an API to access the large quantities of data. Applications such as, e.g., MicroStation® products, which are developed by Bentley Systems, Inc., Exton, Pa. U.S.A., and AutoCAD® products, which are developed by Autodesk, Inc., San Rafael, Calif., U.S.A. are typical of such CAD software, which may be used in the Engineering, Construction, and Operations (ECO) marketplace.

A typical CAD project employed in the engineering context is stored in numerous files. Each file typically contains one or more engineering models, each of which represents an engineering domain (e.g., structural, electrical, mechanical, plumbing). Moreover, each engineering model requires numerous items represented by a series of elements to support the complex and precise nature of each design. In this context, the term "element" is used to mean a record containing a variable number of bytes of data arranged in a format that can be interpreted by a program. The term "element" differs from the common notion of an "object" in that each element can have a variable number of bytes, whereas the size of an object is typically defined by its class. It is the variable-sized nature of elements that causes their persistent storage to be complicated, because they cannot be written in fixed sized records and arranged in tables, as is typically done in relational databases, for example.

Each item in a model is represented by at least one element or an aggregation of elements. For example, a structural drawing can hold the column and beam layout for a floor plan, which are internally represented by lines, squares and rectangles and additional properties. In this example, an individual beam may be a collection of lines, squares and rectangle elements. The structure of the floor plan may be more complex and require many nested levels of elements to accurately provide a structural representation.

Attributes define the characteristics of an element, for example, its color or line width, and how the element is displayed to a user. It is common practice for attributes of elements stored in a CAD data file to be controlled by a named style. A style itself is a non-graphical entity which records a particular set of values for the attributes needed to construct the element. Similarly, a level (also known as layer) may also control the attributes of elements. A level is also a non-graphical entity. Every element is typically associated with one or more levels. A style is applied to specific types of elements, such as text and dimension elements.

Every level and style has a unique name that identifies its data. Such data can be generalized by calling it "resource data". There can be other forms of resource data such as "Named Views" or "Named Viewgroups." A common feature of such resource data is that it provides a way to reuse information that is used repeatedly or that must be controlled in a centralized fashion.

Every CAD data file can have its own set of resource data. Typically, a group of users work on a set of files during the design and construction process, which set of files in many instances may run into hundreds of files. Files may reference each other. The sum of all files and their implied relationships define a project. Each file consists of a sub-set of all the data in a project.

Typically, multiple CAD data files of a project need a common sub-set of resource data. As the project progresses, this data tends to change and grow. Any data stored in a particular design slowly becomes out of date from the master list. Users need a simple method to update individual files to match the resource data.

Moreover, over time many projects are created. Different projects need different sets of resource data. Projects span disciplines and departments. Different disciplines and departments need their own sets of resource data. Combining the resource data required by different projects, disciplines and departments creates the need for a large number of individual resource data entities and consequently a need to standardize the resource data.

Previous methods for creating standardized resource data and for updating individual design files to match the resource data have not addressed all user needs. For example, MicroStation v.7 Settings Manager is a system that provides users with access to settings and styles. The system is centralized in that all users can access the resource data from one library file. However, the library file is in a specialized format. A special tool must be used to create and maintain data in the library file. Also, the library file must be accessed using a different special tool in order to load the data before starting the tool that utilizes this data. Furthermore, this system only allows the attachment of a single data library to a design file.

The MicroStation v.7 Cell Library System allows the user to acquire graphic data from a collection of library files. The graphic data is also in a specialized format and requires a special tool to export the data to the library. Furthermore, this system does not store most of the non-graphic data due to the specialized file format.

AutoCAD Design Center is a tool used to import cells and styles from other files. Although the files are of the same format as the working file, the data is only available through a specialized tool. The data must be imported into the current file before it can be used as part of the drawing. Also, there is no synchronization from the library data to the current data. Furthermore, each file from which data is imported must be selected individually rather than having a list of all available resource data.

Thus, there is a need for a system and method to centralize, control and distribute predefined information used for creating CAD files and models. The system and method should allow for central control of the information to limit changes, but allow the information to be instantly accessible to users at the point at which the information is to be applied.

SUMMARY OF THE INVENTION

In an exemplary embodiment of the present invention a method of distributing data used in creating CAD design files is provided. The method comprises receiving input defining attributes of elements to be used in a CAD design file; storing the predefined attributes in a resource library at a central location; attaching the resource library to the design file; presenting a graphical user interface (GUI) displaying the contents of the resource library to a user; receiving input from the user selecting contents of the resource library; associating the selected contents with the element being created; and applying the attributes of the selected contents to the element being created.

According to another embodiment of the invention, a computer useable information storage medium storing computer readable program code is provided. The code causes a computer to perform the steps of providing an administrator function allowing the creation of a resource library defining resource data to be applied to a CAD design file; storing the resource library at a central location; providing a user function allowing a user to access the resource library and select resource data from the resource library; and applying the selected resource data to a design file at runtime.

According to another embodiment of the invention, a system for distributing data used in creating CAD design files is provided. The system comprises means for receiving input defining resource data to be used in a CAD design file; means for storing the predefined attributes in a resource library at a central location; means for attaching the resource library to the design file; means for presenting a graphical user interface (GUI) displaying the contents of the resource library to a user; means for receiving input from the user selecting contents of the resource library; means for associating the selected contents with the design file; and means for applying the selected contents to the design file at runtime.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF AN EXEMPLARY EMBODIMENT OF THE PRESENT INVENTION

A system and method providing an optimal way to create, manage and use resource data is provided. In an exemplary embodiment, the system and method provide the ability to store resource data in a library, namely a resource library. A resource library includes resource files that can be attached to a regular data file either automatically, for example, by setting an environment variable, or manually. The resource files are collections of resource data. More than one resource library or resource file may be created and simultaneously attached to a data file. The resource file defines properties of a design file, for example attributes of elements that may be used in creating a CAD model. Typically, the resource library includes definitions of properties that are to be standardized across a project, file, or model. The resource file and the data file should be in the same format.

Figure 1:
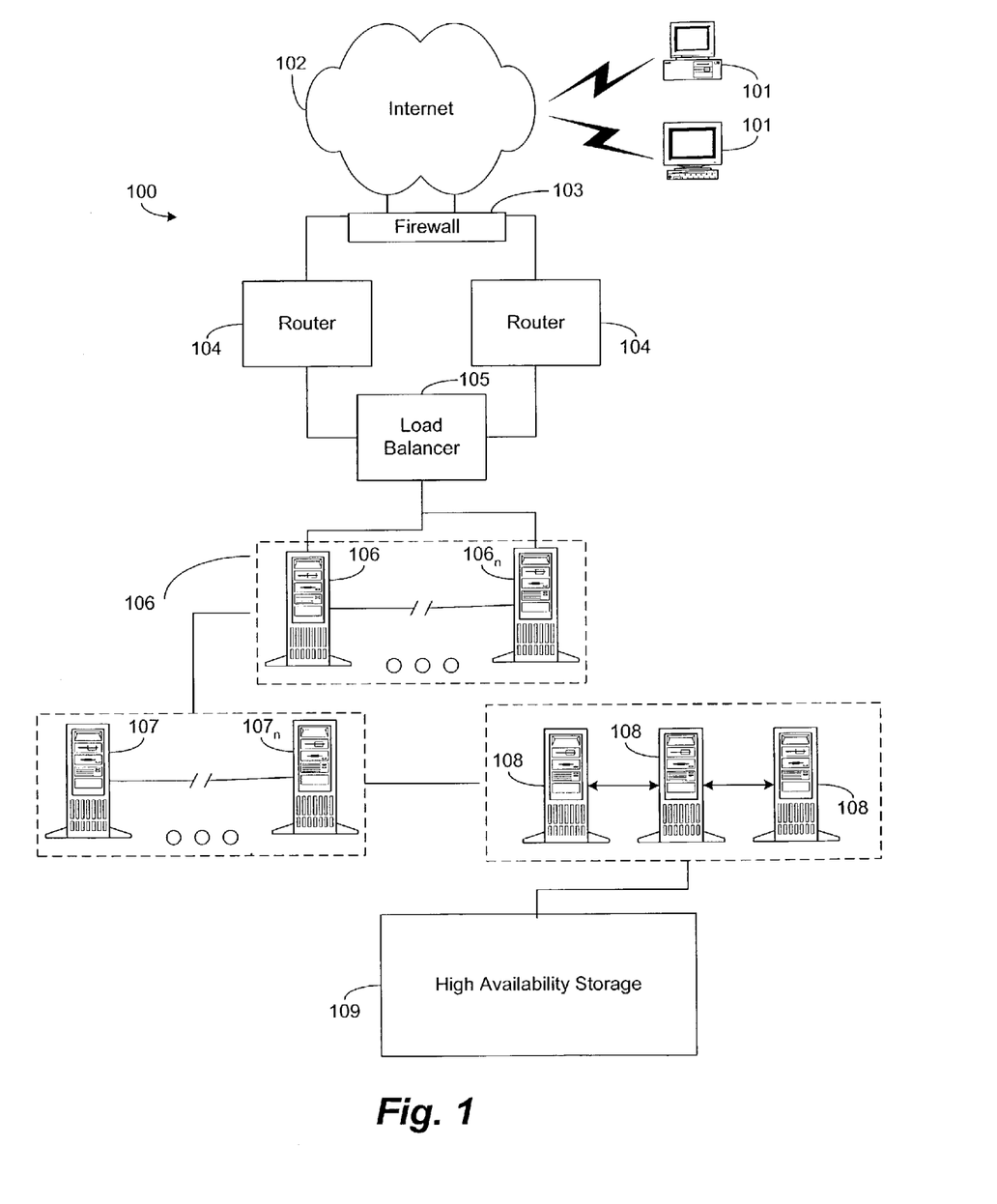
FIG. 1 is a schematic diagram of a network according to an embodiment of the invention.

The method may be implemented via a software program operating in a client-server environment. The software program may be part of a CAD software program or a separate program. The software program may include portions running on the client, the server, or both. Referring now to the drawings, there is shown in FIG. 1 a schematic diagram of a system 100 that provides multi-user access to data or information, such as resource data, stored at a central location. System 100 is intended to be accessed by a plurality of clients or users 101. Such clients 101, in turn, suitably comprise one or more conventional personal computers and workstations. It should be understood, nevertheless, that other clients 101 such as Web-enabled hand-held devices (e.g., the Palm V™ organizer manufactured by Palm, Inc., Santa Clara, Calif. U.S.A., Windows CE devices, and "smart" phones) which use the wireless access protocol, and Internet appliances fall within the spirit and scope of the present invention.

Clients 101 of all of the above types suitably access system 100 by way of the Internet 102. By use of the term "Internet", it should be understood that the foregoing is not intended to limit the present invention to a network also known as the World Wide Web. It includes intranets, extranets, Virtual Private Networks (VPNs), Local Area Networks (LANs), Wide Area Networks (WANs), and the like.

Clients 101 are directed to web servers 106 through firewall 103, routers and proxy servers 104 and load balancer 105. Each of the web server $106_1$, $106_2$, ... $106_n$ is, in turn, preferably comprised of a HP LH3R NetServer (manufactured by Hewlett-PackardCorporation). Preferably, each of the web servers $106_1$, $106_2$, ... $106_n$ further comprises a Microsoft® Windows® NT operating system, and Netscape Enterprise Server, Release 3.6.3 (developed by Netscape Communications, a subsidiary of America Online, Inc., Dulles, Va. U.S.A.). Certificate servers (e.g., web certificate servers and wireless certificate servers, which are available from VeriSign, Inc., Mountain View, Calif. U.S.A.) may optionally be deployed on each of the web servers $106_1$, $106_2$, ... $106_n$.

System 100 further comprises a plurality of application servers $107_1$, $107_2$, ... $107_n$, coupled to and providing support to the web servers $106_1$, $106_2$, ... $106_n$. Each of the application servers $107_1$, $107_2$, ... $107_n$ is, like the web servers $106_1$, $106_2$, ... $106_n$, preferably comprised of a HP LH3R NetServer. System 100 further comprises a plurality of databases $108_1$, $108_2$, ... $108_n$, coupled to the application servers, preferably comprised of HP LH3R NetServers using Oracle. High availability storage 109 for the database 108 is also provided.

Information and data relating to a design project is stored in databases 108 and high availability storage 109. Clients 101 can access the database 108 through servers 106, 107. Of course, many variations of the above-described exemplary client-server environment are permissible within the scope of the present invention.

The software program implementing a method according to an embodiment of the invention may provide different functionality for administrators and for regular users. For example, an administrator may be given permission to control the creation and management of a resource library through an administrator function. A user may be given permission to access and use the resource library in creating a design file through a user function. The resource library should be stored at a central location such as database 108 to allow the various users of the system access to the resource library. The resource library is preferably accessed as the CAD design is being created. The attributes defined in the resource library are then applied to the CAD design file. The attributes defined in the resource library can be applied across a project to standardize the appearance of the CAD design files comprising the project.

Once a resource file is set in a resource library, the resource file can be set with permissions to allow only certain users access to the file. Permission to make changes to the resource file is typically limited to a CAD administrator. Thus, the resource file is essentially made accessible to regular users as a read-only file, where the resource data can be utilized, but the making of any modification to the resource data is prevented.

Setting up the creation and management of resource files and libraries as an administrative function provides control over the design files that are created. For example, if a resource file needs to be modified and this resource file is changed at the administrative level, essentially, all of the design files that utilize this resource file are affected globally. Any change or modification can be made very easily and quickly, affecting a few files to hundreds of files. Modifying resource files through a resource library is a very powerful administrative tool and can be used to apply design standards across a project. The resource library file format is preferably the same format as that of a regular data file. Therefore, the administrator can use the same powerful tools that are available to a regular user to create and modify the resource file.

As mentioned above, the resource library may include cells, levels, and styles, such as dimension styles and text styles. Embodiments of the invention are described in more detail below using levels as an example of resource data, but the description is equally applicable to other definitions of resource data and resource libraries.

Figure 2:
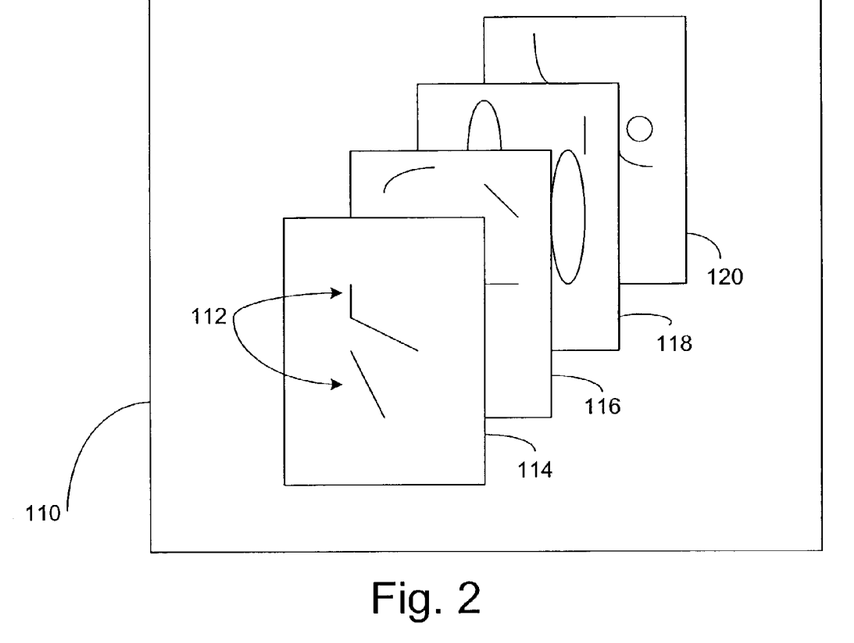
FIG. 2 is a schematic diagram of levels in a design file according to an embodiment of the invention.

FIG. 2 illustrates an example of how a file may be organized into levels. A file 110 contains graphics data. The graphics data includes elements 112 that make up the lines, shapes, surfaces, and solids comprising a model. Each element 112 in a model is on a drawing level 114-120. Levels are analogous to transparent overlays. A level is a way of defining a collection of elements in the model. In other words, a level is a way of organizing the data in the file. In different combinations, the levels make it easier to see parts of a model. A user can create and define a virtually unlimited number of levels. Typically, a company or organization desires to standardize what is included in each level. The level is then defined as a standard and stored in the resource library.

For example, a file 110 may be divided into an electrical level 114, a plumbing level 116, a floor plan level 118, etc. Each of these defined levels corresponds to resource data. The level includes predefined attributes as to how an element in that level is to be displayed. For example, the electrical level is defined to include all wires; the plumbing level is defined to include all pipes, etc. Each pipe in the plumbing level may be defined to have a particular color with a particular line weight. When a line is drawn on the pipe level, it is represented as a pipe. All lines in the pipe level can be controlled by the symbology defined by the pipe level. Whenever a pipe is drawn in the pipe level, the attributes as defined in the pipe level are applied to the pipe element. As all users may be required to place all pipes on the pipe level, the representation of all pipes across a project or design file can be standardized.

The levels and the attributes defined therein are a type of resource file. For example, the pipe level and its defined properties are stored in a resource file. Groups of related resource files are stored in a resource library. For example, all the levels for a project may be grouped together and stored in a level library, which is a type of resource library. A resource file may also be thought of as a resource library as multiple resources can exist in a resource file.

Figure 3:
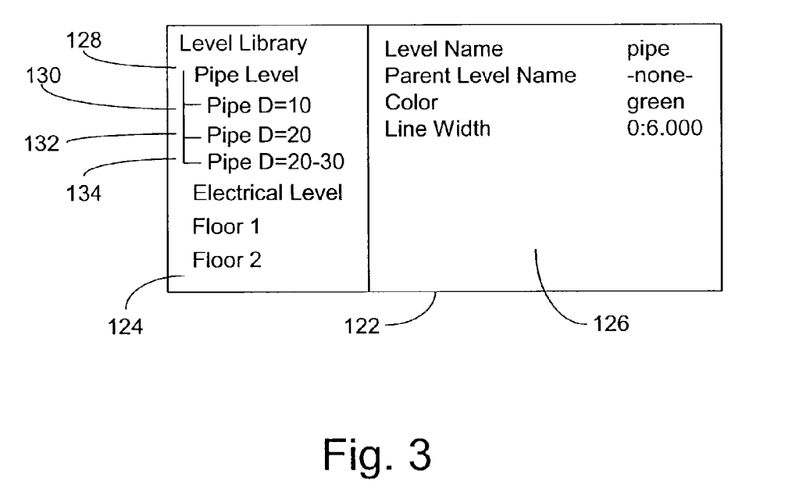
FIG. 3 is a schematic diagram of a display of level hierarchies according to an embodiment of the invention.

The resource libraries and resource files may be arranged in a hierarchical fashion. For example, continuing with the example of levels, a level called a parent level can have sub-levels called child levels. A child level inherits the attributes of its parent levels, while defining additional attributes. FIG. 3 illustrates an example of a display relating to level hierarchies. The display 122 includes dialogue boxes 124, 126. Dialog box 124 displays the contents of the level library, that is each of the levels that have been defined by the administrator. An indicator is placed next to the levels in a known manner to indicate whether a level has any sub-levels. Dialog box 126 displays the various properties and attributes of a level selected in dialog box 124. For example, the level name, parent level name, and attributes such as color, line, width, etc., may be displayed in dialog box 126. The pipe level is defined as the parent level in this example. The pipe level 128 is defined to include all pipes in the model. Thus, every pipe is a part of the pipe level. The pipe level 128 can be further divided into child levels 130-134. A first child level 130 is defined to include all pipes that have a diameter of 10. A second child level 132 is defined to include all pipes that have a diameter of 20. The child levels 130-134 may have their own child levels, and so on. When an element is placed the level 132, the attributes of level 132 as well as the attributes of parent level 128 are applied to that element. When an element is placed in parent level 128, only the attributes defined in parent level 128 are applied to that element, as level 128 is a top or default level in this example.

Accordingly, the CAD Administrator is provided with a consistent and powerful way to create and manage resource libraries. The administrator can initially define the one or more resource libraries. Regular users such as project leads and operators may be granted permission to add to the list of resource libraries. Permission for the project lead and operators to do so may be controlled by the administrator. When project leads and users are granted permission to create resource libraries, the resource libraries are processed in a defined order. For example, an order may be company standards, project standards, and then operator's work. Thus, a CAD model can be tightly controlled to standardize many of its properties, while still providing some freedom to the user to create their own definitions. Additioanlly, a standard CAD tool can be used to edit these resources. No special tool is required for either the administrator or the regular user.

Once a resource library is created it needs to be made available to users. The resource library should be stored at a central location that is accessible to all users who need access. For example, the resource library may be stored in database 108 and storage 109 that communicates with servers 106, 107. Many resource libraries containing numerous resource files may be created and stored on database 108. Only some of these resource libraries and resource files may be applicable to a particular project, design file, or model. Therefore, a mechanism for making the relevant resource files available to a user should be provided. In an exemplary embodiment, this is accomplished by attaching a resource library to a design file. Once a resource library is attached to a design file, the resource files and resource data in that library become available to the user. A more detailed description of attaching a library to a design file is provided below.

In an exemplary embodiment of the invention, the capability to either automatically attach a resource library to a design file or to manually attach a resource library to a design file is provided. Automatically attaching a resource library attaches resource data to the design file in a central fashion. This is typically accomplished by setting an environment variable. The environment variable points to a list of library resources or to a directory (folder) which contains the resource library resource files. Then, when any design file is opened, the environment variable is read-in to create a list of resource library resource files that are then attached the current working design file. The environment variable is preferably under the control of the CAD Administrator. The environmental variable preferably applies to all design files in a project when it is set. Thus, all resource libraries can be made available in this manner.

Manually attaching a resource library to a design file attaches resource data on a per-file basis. The user may attach one or more resource library resource files to a design file. When attached to one design file, the resource library is not automatically attached to other design files. Every design file may have its own list of attached resource libraries. The action of manually attaching resource libraries is preferably not done under the control of CAD Administrator, but is done by the regular user who works on the design files.

The capability to copy-in or import resource data into a design file may also be provided. Consider a situation when resource library resource files are automatically attached in a central fashion. In such a situation, the resource library resource files are typically available over a network so that all users may have access to the resource data. If the network goes down or the user works remotely for a temporary period, then the resource file is no longer available. The ability to copy-in resource files is designed to solve this problem. Copying-in the resource file incorporates the resource file into the design file. A resource file may be copied in under user control, or may be copied in when the resource file is actually used in the design file. The user may copy-in sub-sets of a resource library or the entire resource library into the current working CAD file. Then if the central library resource files are not available for whatever reason, the user still has the ability to access the resource data and can continue to use the resource data that is required in the current working CAD file.

It should be noted that the action of attaching resource library resource files does not necessarily copy-in resource data to the design file. Attaching a resource library makes available the resource data in a seamless fashion—as if the resource data is directly stored in the working design file—but the resource data is not always copied into the working design file. Typically, it is more efficient to copy-in resource data into the working design file only when required in order to optimize the size of the design file.

The ability to attach a resource library gives the regular user the ability to refer to and use the library as provided by the administrator. The resource data remains under the control of the administrator. As and when changes are made to the resource library, the change is almost instantaneously available to the regular user.

The resource libraries can be processed at run time to account for any changes to the resource library and distributed to users through a graphical user interface (GUI). For example, as a user is creating or modifying a design file, different attributes of the elements in the design file need to be defined. This definition can come from either the user or from the resource library. The GUI displays the available resources from both the current file and the associated resource libraries together so that the user may select the resources as if they are all in the current file. A resource file has a type and a name that is used to distribute it to the correct locations in the software program's GUI. For example, resource libraries may be defined with an *.dgnlib extension.

Figure 4:
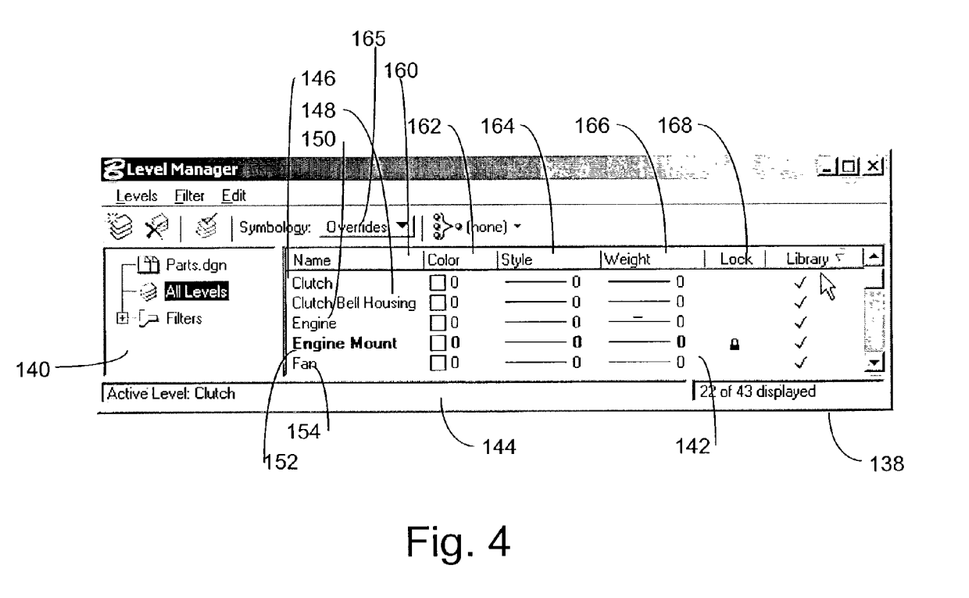
FIG. 4 is a diagram of a level manager GUI according to an embodiment of the invention.

FIG. 4 illustrates an example of a GUI 138 displayed to a user when using a resource library. Once a resource library is attached to a design file, the contents of the resource library may be displayed in a dialog box in the GUI. The GUI 138 includes two dialog boxes 140, 142. Dialog box 140 displays the available levels in a manner similar to a file directory tree. Here the library is a level library and the levels for a CAD file named parts.dgn are shown. Dialog box 142 displays the contents of the level that is selected in dialog box 140. The option to display all levels is selected, as shown by the "All Levels" item being highlighted. The parts.dgn file includes forty-three levels, but only twenty-two are displayed, as indicated in toolbar 144. A filter function can be provided so a user can select the types of libraries to view. The name of each level 146-154 is displayed as a separate entry in column 160 in dialog box 142. The various attributes that are defined by that level are displayed in columns 162-168.

Once the resource files in the resource library are displayed to the user, the user may select which resource is to be applied to the design file being created or modified. In the example given above regarding levels, each element in a model is assigned to a level. An element that is created in a model is assigned to the current active level. Toolbar 144 in GUI 138 displays the current active level. The element being created or modified is given the attributes defined by the active level, for example the line weight and color defined for that level. The active level can be changed simply by double-clicking on the desired level displayed in dialog box 140. GUIs similar to the one discussed above for levels may be provided for the different types of resource libraries.

Referring again to copying-in a resource, the design file is self-contained when a resource is copied from its source file at the central location to the local design file. The user may then detach from the library system and yet continue to use the resource data that is required in the current working design file. Copying-in thus permits subsequent work to continue off-line, without access to the resource library. However, the resource library may be modified while work is being performed off-line. This may occur when a company changes its standards and therefore modifies the resource library. If the resource library has been copied-in to the design file before the changes are made to the resource library, the design file is not synchronized with the resource library.

Consequently, a means for synchronizing the resources imported into the design file with the updated resource libraries is preferably provided. In an exemplary embodiment, when a resource is copied into a design file, the copy of the resource is associated with its original maintained at the central location. A key advantage of this association is the ability to synchronize the copied information to its original in the resource library, should the administrator choose to change the original information for any reason. The user can be notified that the copy is different from the original.

A modified indicator can be presented to the user when they are attached to the library system and a resource has been modified. The modified indicator, along with the source file, are indicated when a resource library is shown in the GUI 138.

This information allows the user to identify where the resource file is coming from, and if it is different from a previously used resource file of the same name.

The name of the source file and the name of the resource file should be independent from each other. Therefore, the source file can be replaced at run time and compared to the local resource files. This allows the user to compare different source files and update/synchronize resource files by name if desired. Synchronization changes attributes of a resource library that the current design file uses to be the same as those attributes in the original resource library. All the resource files in the current design file can be synchronized with one command. Additionally, if the resource libraries or files are arranged in a hierarchical or nested fashion, the nested levels can be synchronized.

According to another embodiment of the invention, a user is given the ability to override the definitions in the resource libraries. Override control is available in the context of the current working design file. With this flexibility, even though the administrator remains in overall control by the resource library, the user has control over their data in the working design file. The list of attributes that may be overridden is controlled by an environment variable, which is under the control of the administrator via the administrator function. The administrator may allow the override to take place at various permission levels. For example, an override may be permissible by a project leader or, at a lower level, by a designer. The override control may be provided on a per attribute basis.

Figure 5:
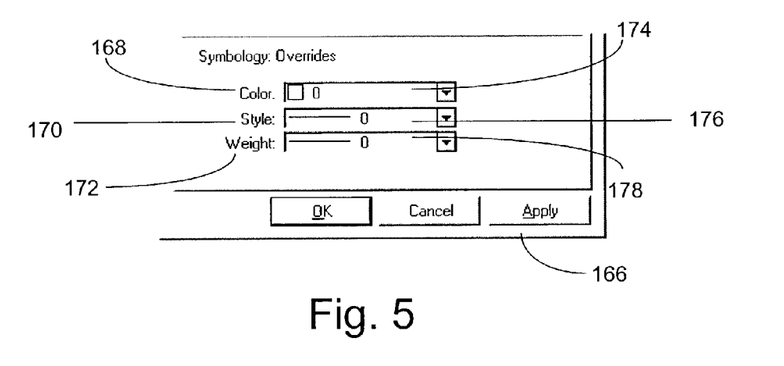
FIG. 5 is a GUI for user overrides according to an embodiment of the invention.

Referring again to FIG. 4, the override function according to an exemplary embodiment of the invention is described. GUI 138 may be provided with an override button 165. The user depresses button 165 to initiate the override function. When button 165 is depressed the attributes that are available for override in the selected resource library are displayed. FIG. 5 is an example of a GUI 166 that displays the attributes that may be overridden. Each of the attributes 168-172 for the element being created or modified is shown. Adjacent to each attribute is a text box 174-178 displaying the current value for that attribute. For example, the color attribute 168 in the example shown in FIG. 5 is currently set to a value of 0. In order to change the value of an attribute, the user clicks on a button adjacent to text boxes 174-178, which displays a menu of the values available for that attribute. The user makes a selection from this menu and the value of the attribute is changed to the selected value.

Accordingly, a system and method providing an optimal way to create, manage and use resource data is provided. An administrator can be provided with a consistent powerful tool to create and manage resource libraries. The resource library can be utilized by users to implement standards.

The embodiments illustrated and discussed in this specification are intended only to teach those skilled in the art the best way known to the inventors to make and use the invention. Nothing in this specification should be considered as limiting the scope of the present invention. The above-described embodiments of the invention may be modified or varied, and elements added or omitted, without departing from the invention, as appreciated by those skilled in the art in light of the above teachings. It is therefore to be understood that, within the scope of the claims and their equivalents, the invention may be practiced otherwise than as specifically described. For example, the sequence of performing the steps of the methods described above may be varied as long as the above-described dependencies are maintained.

What is claimed is:

1. A method for creating data and applying the data in a CAD design model, comprising:
    creating data to be applied during a design of the CAD model as part of an administrator role, the creating data including,
        receiving input defining attributes of elements to be used in the CAD model to obtain predefined attributes,
        storing the predefined attributes in a data resource file having a same file format as the CAD model;
        storing the data resource file in a resource library at a central location that is accessible to a plurality of users; and
    creating a design file in a user role, the creating including,
        providing access to the resource library at the central location to at least one of the plurality of users,
        presenting a graphical user interface (GUI) displaying the data resource file of the resource library to the at least one user,
        receiving input from the at least one user selecting the data resource file of the data resource library,
        receiving input from the user creating an element of the CAD model,
        associating the attribute in the data resource file to the element as the element is being created, and
        applying the selected data resource file to define attributes of the element as the element is being created in the CAD model.

2. The method of claim 1, further comprising restricting the ability to change the resource library to only the administrator role.

3. The method of claim 1, wherein the attaching step comprises importing the selected contents of the resource library into the CAD model.

4. The method of claim 3, further comprising synchronizing the imported contents of the data resource file with the data resource file stored at the central location.

5. The method of claim 1, further comprising displaying a source file for the resource library.

6. The method of claim 5, further comprising displaying a difference indicator for the source file.

7. The method of claim 1, further comprising manually attaching the data resource file to the CAD model.

8. The method of claim 1, further comprising automatically attaching the data resource file to the CAD model.

9. The method of claim 1, further comprising detaching the CAD model from the central location.

10. The method of claim 1, further comprising:
    receiving input via the administrator role allowing certain attributes to be overridden by the user to obtain overridden attributes; and
    setting an override flag for the overridden attributes.

11. The method of claim 10, further comprising:
    receiving input from the user changing attributes of the element; and
    making changes to the element corresponding to the input if the override flag is set or is not present.

12. The method of claim 1, wherein the attributes are applied to the element at run-time.

13. The method of claim 1, further comprising using one editor to create or modify the CAD model and the resource library.

14. The method of claim 1, further comprising filtering the contents of the resource library and presenting the filtered contents in the GUI.

15. A computer useable information storage medium storing computer readable program code for causing a computer to perform the steps of:

providing an administrator function allowing the creation of a resource library defining resource data to be applied to a CAD design file, the administrator function receiving input defining attributes of elements to be used in the CAD design file to obtain predefined attributes, storing the predefined attributes in a data resource file having a same file format as the CAD design file, storing the data resource file in a resource library at a central location that is accessible to a plurality of users;

providing a user function allowing a user to access the resource library and select resource data from the resource library providing access to the resource library at the central location to at least one of the plurality of users, presenting a graphical user interface (GUI) displaying the data resource file of the resource library to the at least one user, receiving input from the at least one user selecting the data resource file from the data resource library to obtain a selected data resource file, receiving input from the user creating an element of the CAD design file;

associating the selected data resource file with the element as the element is being created in the CAD design file; and applying the attributes of resource data at runtime to affect the appearance of the elements in the CAD design file.

16. The computer useable information storage medium of claim 15 further comprising computer readable program code for causing a computer to perform the steps of:

allowing modifications to the data resource file in the resource library only via the administrator function to obtain modified resource data; and applying the modifications to all CAD design files associated with the modified resource data.

17. The computer useable information storage medium of claim 15 further comprising computer readable program code for causing a computer to perform the step of attaching the data resource library to the CAD design file.

18. The computer useable information storage medium of claim 15 further comprising computer readable program code for causing a computer to perform the step of granting permission to override the data resource file via the administrator function.

19. The computer useable information storage medium of claim 18 further comprising computer readable program code for causing a computer to perform the steps of:

receiving user input via the user function overriding the data resource file to obtain modified resource data; and applying the modified resource data to the CAD design file.

20. The computer useable information storage medium of claim 15 further comprising computer readable program code for causing a computer to perform the step of importing the selected data resource file of the resource library into the CAD design file.

21. The computer useable information storage medium of claim 20 further comprising computer readable program code for causing a computer to perform the step of synchronizing the selected data resource file with the resource library stored at the central location.

22. A system for distributing data used in creating CAD design files, comprising:

means for creating data to be applied during a design of the CAD model as part of an administrator role, the creating data including, means for receiving input defining attributes of elements to be used in the CAD model to obtain predefined attributes, means for storing the predefined attributes in a data resource file having a same file format as the CAD model;

means for storing the data resource file in a resource library at a central location that is accessible to a plurality of users; and means for creating a design file in a user role, the creating including, means for providing access to the resource library at the central location to at least one of the plurality of users, means for presenting a graphical user interface (GUI) displaying the data resource file of the resource library to the at least one user, means for receiving input from the at least one user selecting the data resource file of the data resource library, means for receiving input from the user creating an element of the CAD model, means for associating the attribute in the data resource file to the element as the element is being created, and means for applying the selected data resource file to define attributes of the element as the element is being created in the CAD model.

23. The system of claim 22, wherein the data resource file is a style.

24. The system of claim 23, wherein the style is a text style.

25. The system of claim 23, wherein the style is a dimension style.

26. The system of claim 22, wherein the data resource file is a level.

* * * * *